US010543909B2

(12) United States Patent
Kipp et al.

(10) Patent No.: US 10,543,909 B2
(45) Date of Patent: Jan. 28, 2020

(54) SYSTEM AND METHOD FOR AIRCRAFT ELECTRIC TAXI BRAKE OPTIMIZATION (71) Applicant: Goodrich Corporation, Charlotte, NC (US)

(72) Inventors: Richard A. Kipp, Oakwood, OH (US); Steven T. Keller, Union, OH (US)

(73) Assignee: GOODRICH CORPORATION, Charlotte, NC (US)

(*) Notice: Subject to any disclaimer, the term of this patent is extended or adjusted under 35 U.S.C. 154(b) by 35 days.

(21) Appl. No.: 15/701,075

(22) Filed: Sep. 11, 2017

(65) Prior Publication Data
US 2019/0077500 A1    Mar. 14, 2019

(51) Int. Cl.
B64C 25/42     (2006.01)
B60T 8/17      (2006.01)
B60T 8/171     (2006.01)
B60T 17/22     (2006.01)
G05D 1/02      (2006.01)
B60T 8/172     (2006.01)

(52) U.S. Cl.
CPC .......... B64C 25/426 (2013.01); B60T 8/171 (2013.01); B60T 8/172 (2013.01); B60T 8/1703 (2013.01); B60T 17/22 (2013.01); G05D 1/0202 (2013.01); B60T 2270/60 (2013.01)

(58) Field of Classification Search
CPC .. B64C 25/426; G05D 1/0202; B60T 2270/60
See application file for complete search history.

(56) References Cited

U.S. PATENT DOCUMENTS

| 5,172,960 | A  |   | 12/1992 | Bugatti |
| 8,311,685 | B2 |   | 11/2012 | Bugatti |
| 9,280,155 | B2 | * | 3/2016  | Cox ..................... G05D 1/0083 |
| 9,417,629 | B2 |   | 8/2016  | Nutaro et al. |
| 9,499,141 | B1 | * | 11/2016 | Elkenkamp ............... B60T 7/22 |
| 9,540,097 | B2 |   | 1/2017  | Schmidt et al. |

(Continued)

FOREIGN PATENT DOCUMENTS

CA    2994666 A1 * 12/2016
WO   2017094823      6/2017

OTHER PUBLICATIONS

European Patent Office, European Search Report dated Feb. 5, 2019 in Application No. 18192513.2.

*Primary Examiner* — Rami Khatib
(74) *Attorney, Agent, or Firm* — Snell & Wilmer, L.L.P.

(57) ABSTRACT

Systems and methods for aircraft electric taxi brake optimization are provided. The system may comprise an aircraft having a landing gear comprising a wheel, a friction brake having a brake material coupled to the wheel, a regenerative brake comprising a reversible taxi motor coupled to the wheel, a sensor configured to measure a wheel parameter of the wheel and a temperature of the friction brake, a tangible, non-transitory memory configured to communicate with a controller, the tangible, non-transitory memory having instructions stored thereon that, in response to execution by the controller, cause the controller to perform operations comprising: receiving, by the controller, a command signal and the friction brake temperature and calculating, by the controller, a brake material temperature based on the wheel parameter, the friction brake temperature, and the command signal.

20 Claims, 3 Drawing Sheets (56) References Cited

U.S. PATENT DOCUMENTS

| | | |
|---|---|---|
| 9,567,100 B2 | 2/2017 | Jackson et al. |
| 9,630,708 B2 | 4/2017 | Lo et al. |
| 2006/0038068 A1* | 2/2006 | Sullivan .................... B60L 7/26 |
| | | 244/111 |
| 2008/0258014 A1* | 10/2008 | McCoskey ................ B60L 7/10 |
| | | 244/221 |
| 2009/0218440 A1 | 9/2009 | Dilmaghani et al. |
| 2011/0062280 A1* | 3/2011 | Gieras ................... B60T 13/741 |
| | | 244/58 |
| 2011/0144875 A1* | 6/2011 | Rado .................... B60T 8/1703 |
| | | 701/70 |
| 2014/0114557 A1* | 4/2014 | Nutaro ................... G01C 21/00 |
| | | 701/121 |
| 2015/0286215 A1* | 10/2015 | Alvarado, Jr. ......... B64D 45/00 |
| | | 701/3 |
| 2016/0124428 A1 | 5/2016 | Nutaro et al. |
| 2016/0176515 A1* | 6/2016 | Sullivan .................... B60L 7/26 |
| | | 244/50 |
| 2016/0318492 A1* | 11/2016 | Miller ..................... B64C 25/42 |
| 2017/0305577 A1* | 10/2017 | Bill ............................ B64F 5/60 |
| 2019/0009891 A1* | 1/2019 | Morris ................. B64C 25/445 |

* cited by examiner

SYSTEM AND METHOD FOR AIRCRAFT ELECTRIC TAXI BRAKE OPTIMIZATION

FIELD

The present disclosure relates to electric taxi system brakes, and, more specifically, to systems and methods for controlling aircraft brakes.

BACKGROUND

Aircraft often include one or more landing gear that comprise one or more wheels. Wheels may comprise friction brakes having a brake material which tends to suffer increased wear and damage when operated outside a preferred operating temperature range. A brake control unit may optimize brake life by selecting friction braking under optimal speeds, temperatures, or other conditions, or by optimizing the temperature of the brakes to the lowest wear region of the operating envelope. Brake life may be further optimized under wet conditions by optimizing a brake drying protocol.

SUMMARY

In various embodiments, a system for aircraft electric taxi brake optimization is provided. The system may comprise an aircraft having a landing gear comprising a wheel, a friction brake having a brake material coupled to the wheel; a regenerative brake comprising a reversible taxi motor coupled to the wheel, a sensor configured to measure a wheel parameter of the wheel and a friction brake temperature of the friction brake, and a tangible, non-transitory memory configured to communicate with a controller. The tangible, non-transitory memory having instructions stored thereon may, in response to execution by the controller, cause the controller to perform operations comprising: receiving, by the controller, a command signal, the wheel parameter, and the friction brake temperature; calculating, by the controller, a brake material temperature based on the wheel parameter, the friction brake temperature, and the command signal; and generating, by the controller, an allocated deceleration for the friction brake and the regenerative brake corresponding to the calculated brake material temperature and the command signal.

In various embodiments, the wheel parameter is one of a torque, an angular rotation, a wheel speed, or a brake pressure. In various embodiments, the operations further comprise the step of controlling, by the controller, a brake pressure of the friction brake or a mode of the reversible taxi motor in response to the command signal and the allocated deceleration. In various embodiments, the aircraft further comprises a propulsion system and aerodynamic surfaces. In various embodiments, the operations further comprise the step of generating, by the controller, an allocated deceleration for the propulsion system and the aerodynamic surfaces corresponding to the calculated brake material temperature and the command signal. In various embodiments, the operations further comprise the step of controlling, by the controller, one of a speed brake, a spoiler, a thrust reverser, or a gas turbine engine power setting in response to the allocated deceleration and the command signal. In various embodiments, the operations further comprise the step of modulating, by the controller, the allocated deceleration based on one of the friction brake temperature or the command signal. In various embodiments, the operations further comprise the step of receiving, by the controller, external data and modulating, by the controller, the allocated deceleration in response to the external data. In various embodiments, the calculating, by the controller, the brake material temperature is further calculated with respect to time. In various embodiments, the operations further comprise the step of reading, by the controller, a first configuration setting wherein the calculating, by the controller, the brake material temperature is further based on the first configuration setting. In various embodiments, the operations further comprise the step of reading, by the controller, a second configuration setting and modulating, by the controller, the allocated deceleration in response to the second configuration setting. In various embodiments, the system further comprises a second sensor configured to measure an aircraft parameter of the aircraft. In various embodiments, the operations further comprise the step of reading, by the controller, the aircraft parameter and wherein the allocated deceleration is one of: generated, by the controller, based on the aircraft parameter or modulated, by the controller, in response to the aircraft parameter. In various embodiments, the aircraft parameter is one of an airspeed, a ground speed, a position, a roll angle, a pitch angle, a yaw angle, an acceleration, a weight, an oleo strut pressure, a temperature, a battery capacity, an accumulator pressure, a thrust reverser position, a gas turbine engine power setting, a spoiler position, a speed brake position, an air pressure, or a generator power output.

In various embodiments, a method for aircraft electric taxi brake optimization is provided. The method may comprise: receiving, by a controller, a command signal and receiving, by the controller, a wheel parameter and a friction brake temperature from a sensor in electronic communication with the controller wherein the wheel parameter comprises measured characteristics of a landing gear comprising: a wheel, a friction brake having a brake material coupled to the wheel, and a regenerative brake comprising a reversible taxi motor coupled to the wheel; calculating, by the controller, a brake material temperature based on the wheel parameter, the friction brake temperature, and the command signal; and generating, by the controller, an allocated deceleration for the friction brake and the regenerative brake corresponding to the calculated brake material temperature and the command signal.

In various embodiments, the method may also comprise controlling, by the controller one of, a brake pressure of the friction brake, a mode of the reversible taxi motor, a speed brake, a spoiler, a thrust reverser, or a gas turbine engine power setting in response to the command signal and the allocated deceleration. The method may further comprise modulating, by the controller, the allocated deceleration based on one of an aircraft parameter from a second sensor in electronic communication with the controller, the friction brake temperature, the command signal, a configuration setting, or external data.

In various embodiments an article of manufacture is provided. The article of manufacture may include a tangible, non-transitory computer-readable storage medium having instructions stored thereon that, in response to execution by a processor, cause the processor to perform operations comprising: receiving, by the processor, a command signal and receiving, by the processor, a wheel parameter and a friction brake temperature from a sensor in electronic communication with the processor wherein the wheel parameter comprises measured characteristics of a landing gear comprising: a wheel, a friction brake having a brake material coupled to the wheel, and a regenerative brake comprising a reversible taxi motor coupled to the wheel; calculating, by the processor, a brake material temperature based on the wheel parameter, the friction brake temperature, and the command signal; and generating, by the processor, an allocated deceleration for the friction brake and the regenerative brake corresponding to the calculated brake material temperature and the command signal.

In various embodiments the article of manufacture may further comprise the operation of controlling, by the processor one of, a brake pressure of the friction brake, a mode of the reversible taxi motor, a speed brake, a spoiler, a thrust reverser, or a gas turbine engine power setting in response to the command signal and the allocated deceleration. In various embodiments the article of manufacture may further comprise the operation of modulating, by the processor, the allocated deceleration based on one of an aircraft parameter from a second sensor in electronic communication with the processor, the friction brake temperature, the command signal, a configuration setting, or external data.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). As used herein, "transmit" may include sending electronic data from one system component to another via electronic communication between the components. Additionally, as used herein, "electronic data" may include encompassing information such as commands, queries, files, data for storage, and the like in digital or any other form.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

Aircraft often include one or more landing gear that comprise an oleo strut and one or more wheels. An electronic taxi system may be coupled to the wheels in order to taxi the aircraft without engine thrust and may comprise a Brake Control Unit (BCU). A taxi motor and a friction braking system are coupled to the wheel(s) in order to taxi the aircraft and to decelerate or park the aircraft. In various embodiments, the taxi motor may comprise a reversible electric motor capable of providing a drag force on the wheel(s) and causing electrical energy to be generated. In this regard, the electric taxi motor may operate an electrical generator and extract work from the wheel(s) to decelerate the aircraft (i.e. regenerative braking). In various embodiments energy generated by the taxi motor may be stored onboard the aircraft in batteries, capacitors, flywheels, or other suitable energy storage system. In various embodiments, the taxi motor may be a reversible hydraulic motor and operate in like fashion to an electric taxi motor. Energy extracted by the hydraulic motor may be stored onboard the aircraft by an energy storage system such as, for example, a hydraulic accumulator. In various embodiments, the taxi motor may be coupled to the wheels through a clutch and/or gearbox or other transmission.

Figure 1:
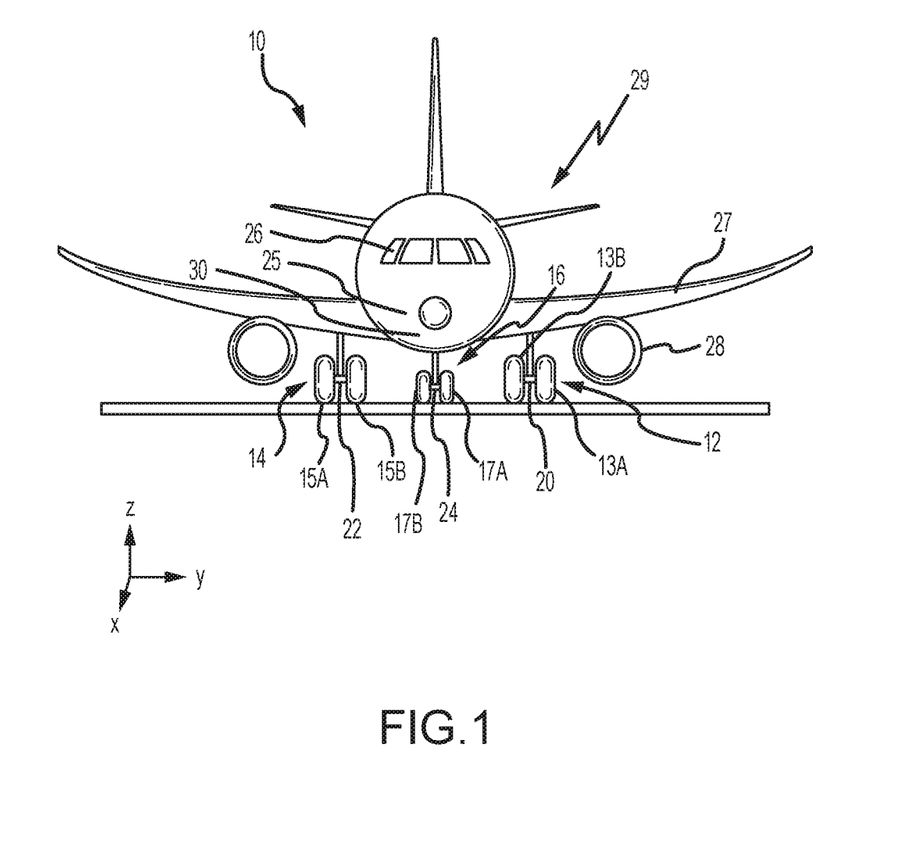
FIG. 1 illustrates an aircraft, in accordance with various embodiments.

With reference to FIG. 1, an aircraft 10 in accordance with various embodiments may comprise aircraft systems, for example, landing gear such as landing gear 12, landing gear 14 and landing gear 16. Landing gear 12, landing gear 14 and landing gear 16 may generally support aircraft 10 when aircraft is not flying, allowing aircraft 10 to taxi, take off, and land without damage and may comprise an electronic taxi system. Landing gear 12 may include wheel 13A, comprising a taxi motor and a friction brake, and wheel 13B comprising a taxi motor and a friction brake, coupled by an axle 20. Landing gear 14 may include wheel 15A comprising a taxi motor and a friction brake, and wheel 15B comprising a taxi motor and a friction brake, coupled by an axle 22. Landing gear 16 may include nose wheel 17A comprising a taxi motor and a friction brake, and nose wheel 17B comprising a taxi motor and a friction brake, coupled by an axle 24. An XYZ axes is used throughout the drawings to illustrate the axial (y), forward (x) and vertical (z) directions relative to axle 22. Aircraft 10 may comprise Brake Control Unit (BCU) 25, cockpit controls 26, aerodynamic surfaces 27, and propulsion system 28. In various embodiments, aerodynamic surfaces 27 may further comprise a spoiler or a speed brake and propulsion system 28 may comprise gas turbine engine and a thrust reverser. Landing gear 14, landing gear 16, and landing gear 12 may be in communication with BCU 25 and may receive commands (e.g. an allocated deceleration effort) from BCU 25, for example, to apply friction brakes or apply regenerative brakes. In various embodiments, BCU 25 may be in electronic communication with cockpit controls 26 or may be in electronic communication with external systems via external command signals 29 such as, for example, an aircraft tug operator or a safety emergency instruction issued by an airport ground controller and may allocate deceleration effort in response to pilot cockpit controls 26 or external command signals 29. In various embodiments, the BCU may be in electronic communication with aerodynamic surfaces 27 and propulsion system 28. In various embodiments, aircraft 10 may comprise an energy storage system 30. BCU 25, landing gear 12, landing gear 14, and landing gear 16 may be in electronic communication with energy storage system 30.

In various embodiments, the BCU is typically located in the fuselage of the aircraft. Wires may extend between the fuselage and the BCU at the location of the wheels. Electric signals may be sent and received between the taxi motor, the friction brake, and the BCU. In various embodiments, electric signals may be sent and received between the BCU and aerodynamic surfaces of the aircraft tending to produce aerodynamic drag such as, for example, spoilers or speed brakes. In various embodiments, electric signals may be sent and received between the BCU and aircraft propulsion system components such as, for example, engine thrust reversers. The BCU may receive signals or commands from a pilot, from sources external to the aircraft, or from any other suitable onboard sensors known to those skilled in the art.

The BCU may be in electronic communication with the full suite of aircraft sensors and other data available with the aircraft such as, for example, GPS, radio beacons, remote commands and the like. Sensors may provide aircraft speed, wheel speed, brake temperature, energy generation, battery capacity, thrust reverser position, acceleration, and any other suitable input data. In response to a commanded deceleration, the BCU may coordinate the inputs of various sensors with internally stored data or configuration settings and algorithmically allocate the deceleration effort between any of the friction brakes, the regenerative brakes, the aerodynamic surfaces, and the propulsion system in order to effect the commanded deceleration.

In various embodiments, the friction brakes may comprise a brake material and a temperature sensor. In various embodiments, the brake material may comprise at least one of a composite material, a carbon material, a carbon/carbon composite material, a silicon-carbide, a ceramic, or other suitable material known to those skilled in the art. In response to the deceleration effort allocated by the BCU, the friction brakes tend to absorb energy from the wheel(s) tending to increase the temperature of the brake material. In various embodiments, the performance of the friction brakes is a function of brake material temperature and the brake material may undergo excessive wear below a threshold temperature or, stated alternatively, a "cold" temperature. In various embodiments, the minimum temperature may be between one hundred degrees (100°) and four hundred degrees (400°), or may be between one hundred and fifty degrees (150°) and three hundred and fifty degrees (350°), or may be between two hundred degrees (200°) and three hundred degrees (300°) Fahrenheit. In various embodiments, the brake material may be damaged above about 2000° F. where about in this context means±500° F.

In various embodiments, the BCU may dynamically modulate the deceleration effort allocated to the friction brakes in response to temperature and tend to maintain the temperature of the brake material between the minimum and the maximum temperature. In response to a commanded deceleration, for example, the BCU may allocate 30% of the deceleration effort to the friction brakes and 70% of the deceleration effort to the regenerative brakes. The BCU may make any other suitable allocation in response to a commanded deceleration, a brake temperature, and the aircraft state described by sensors in electronic communication with the BCU such as, for example, an airspeed sensor, and allocated deceleration effort may be a function of the aircraft state. In various embodiments, when airspeed is above a predetermined threshold such as, for example, airspeed at landing, the BCU, in response to a commanded deceleration, may allocate 50% of the deceleration effort to the friction brakes, 25% to the propulsion system, 20% to the aerodynamic surfaces, and 5% to the regenerative brakes or any other suitable allocation. In response to the deceleration effort, speed tends to fall and the BCU may, in response, reduce deceleration effort allocated to the aerodynamic surfaces and the propulsion system while increasing the deceleration effort allocated to the friction brakes and regenerative brakes. In this regard, the BCU may optimize deceleration effort in light of the performance characteristics of aircraft systems, such as aerodynamic surfaces and propulsion systems, which tend to be more effective at high speeds.

In various embodiments the BCU may dynamically allocate deceleration effort in response to the amount of energy stored in an energy storage system coupled to the regenerative brakes. For example, when the amount of stored energy is at a minimum, relatively more deceleration effort may be allocated to the regenerative brakes and when the amount of stored energy is at a maximum, relatively less deceleration effort may be allocated to the regenerative brakes. In various embodiments, the deceleration effort allocated to the regenerative brakes may be limited by the rate at which the energy storage system may absorb energy, for example, the deceleration effort allocated to the regenerative brakes may not exceed a maximum energy absorption rate.

In various embodiments, BCU deceleration effort allocations may be made a function of a friction brake temperature model. A friction brake temperature model may calculate the energy absorbed by the friction brake as a function of the torque and angular rotation of the wheel coupled to the friction brake, ambient temperature, friction brake temperature, brake friction coefficient, and time. In various embodiments, the friction brake temperature model may be supplied the torque value from a torque sensor or may calculate the torque as a function of the supplied friction brake pressure from a pressure sensor. In various embodiments, the angular rotation of the wheel may be supplied by a wheel speed sensor or may be calculated or estimated from other information. In various embodiments, the BCU may use the friction brake temperature model to predict friction brake temperature based upon commanded deceleration and deceleration effort allocation. In this regard, the BCU may be configured to optimize friction brake temperature such that brake material wear and damage are at a minimum.

Figure 2:
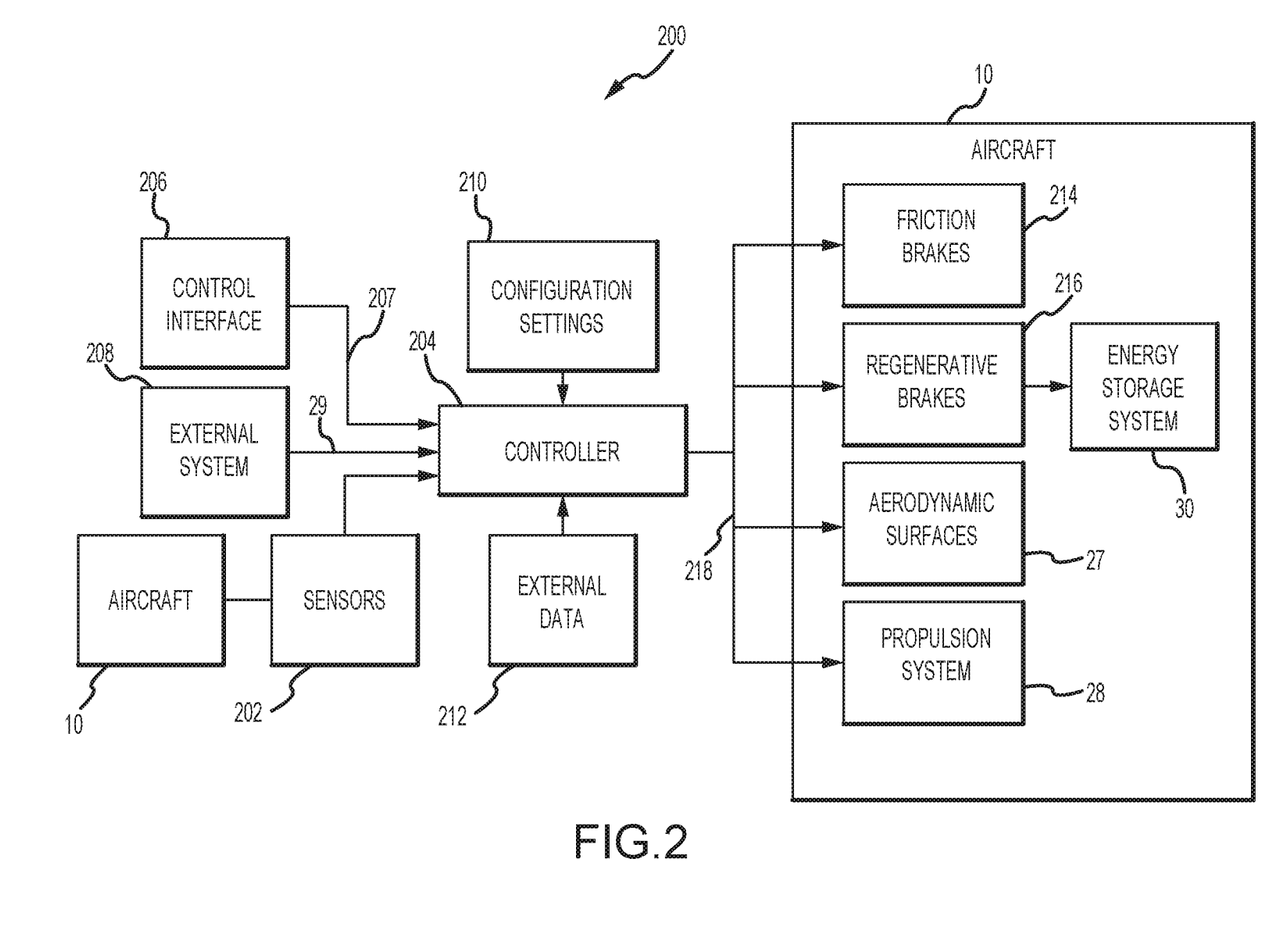
FIG. 2 illustrates a block diagram for a system for electric taxi brake optimization, in accordance with various embodiments.

In various embodiments, and with reference to FIGS. 1 and 2, a system 200 for electric taxi brake optimization may comprise one or more feedback elements to monitor and measure aircraft 10 characteristics. For example, sensors 202 may be coupled to or in direct electronic communication with aircraft systems such as, for example, landing gear 14 comprising a taxi motor and a friction brake or, for example, aerodynamic surfaces 27. Sensors 202 may comprise a temperature sensor, a torque sensor, a speed sensor, a pressure sensor, a position sensor, an accelerometer, a voltmeter, an ammeter, a wattmeter, or any other suitable measuring device known to those skilled in the art. Sensors 202 may be configured to measure a characteristic of an aircraft system or component. Sensors 202 may be configured to measure, for example, a landing gear wheel speed, a friction brake pressure, an aircraft airspeed, or an energy storage system storage capacity. Sensors 202 may be configured to transmit the measurements to controller 204, thereby providing sensor feedback about the aircraft system to controller 204. The sensor feedback may be, for example, a speed signal, or may be position feedback, temperature feedback, pressure feedback or other data.

In various embodiments, controller 204 may be in electronic communication with a pilot through a control interface 206 of cockpit controls 26, for example, a pedal or set of pedals, that a pilot can operate. The control interface 206 may output a measure of, for example, pedal deflection, and such output may be used as command signals 207. In various embodiments, controller 204 may be in electronic communication with an external system 208 through external command signals 29. In various embodiments, the information or instruction issued by the pilot or the external system is of the form of "decelerate" or "discontinue deceleration." In various embodiments, controller 204 may be in electronic communication with configuration settings 210 or library values used by a friction brake temperature model, a brake temperature optimization algorithm, or other algorithm. In various embodiments, controller 204 may be in electronic communication with external data 212 sources which may be used by an algorithm such as, for example, near real time runway condition data from other aircraft, weather condition data, and/or fuel price data.

In various embodiments, controller 204 may be integrated into computer systems onboard an aircraft, such as, for example, BCU 25. In various embodiments, controller 204 may comprise a processor. In various embodiments, controller 204 may be implemented in a single processor. In various embodiments, controller 204 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 204 may comprise a processor configured to implement various logical operations in response to execution of instructions, for example, instructions stored on a non-transitory, tangible, computer-readable medium configured to communicate with controller 204.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, with continued reference to FIGS. 1 and 2, friction brakes 214, regenerative brakes 216, aerodynamic surfaces 27, and propulsion system 28 may be in electronic communication with and may be configured to receive electronic data from or be controlled via controller 204. Controller 204 and regenerative brakes 216 may also be in electronic communication with energy storage system 30. In various embodiments, controller 204 may be configured to control friction brakes 214, regenerative brakes 216, aerodynamic surfaces 27, and propulsion system 28 by allocating deceleration effort in response to command signals. In various embodiments, controller 204 may be configured to modulate or generate the allocated deceleration effort 218 in response to the output of an algorithm such as, for example, a friction brake temperature model comprising instructions stored in tangible, non-transitory memory, to optimize friction brake temperature such that brake material wear and damage are at a minimum. In various embodiments, controller 204 may be configured to modulate or generate the allocated deceleration effort 218 in response to any other algorithm or combination of algorithms and constraints comprising instructions stored in tangible, non-transitory memory, such as, for example, optimizing a friction brake temperature and maximizing stored energy and optimizing deceleration effort.

In various embodiments, controller 204 may allocate deceleration effort to one or more aircraft systems, i.e. friction brakes 214, regenerative brakes 216, aerodynamic surfaces 27, and propulsion system 28, or any combination of single and multiples of aircraft systems such as, for example, four (4) friction brakes 214, two (2) regenerative brakes 216, six (6) aerodynamic surfaces 27, and two (2) propulsion systems 28. In various embodiments, controller 204 may allocate relatively more deceleration effort to friction brakes 214 by, for example, commanding an increase in brake pressure and may allocate relatively less deceleration effort by, for example, commanding a decrease in brake pressure. In various embodiments, controller 204 may allocate deceleration effort to regenerative brakes 216 by, for example, commanding a reversible taxi motor of a wheel, such as wheel 17B, of a landing gear, such as landing gear 16, to charge energy storage system 30 (e.g. change mode from motor to generator). In various embodiments, controller 204 may allocate relatively more deceleration effort to regenerative brakes 216 by commanding additional taxi motors such as, for example, those comprising wheels 17A, 15A, and 13A, to charge energy storage system 30. In various embodiments, controller 204 may allocate relatively more or less deceleration effort to aerodynamic surfaces 27 by, for example, commanding an actuator to raise or lower a spoiler or speed brake. In various embodiments, controller 204 may allocate deceleration effort to a propulsion system 28 by commanding activation of a thrust reverser, where relatively more or less deceleration effort may be allocated by commanding an increase or decrease in gas turbine engine power.

Figure 3:
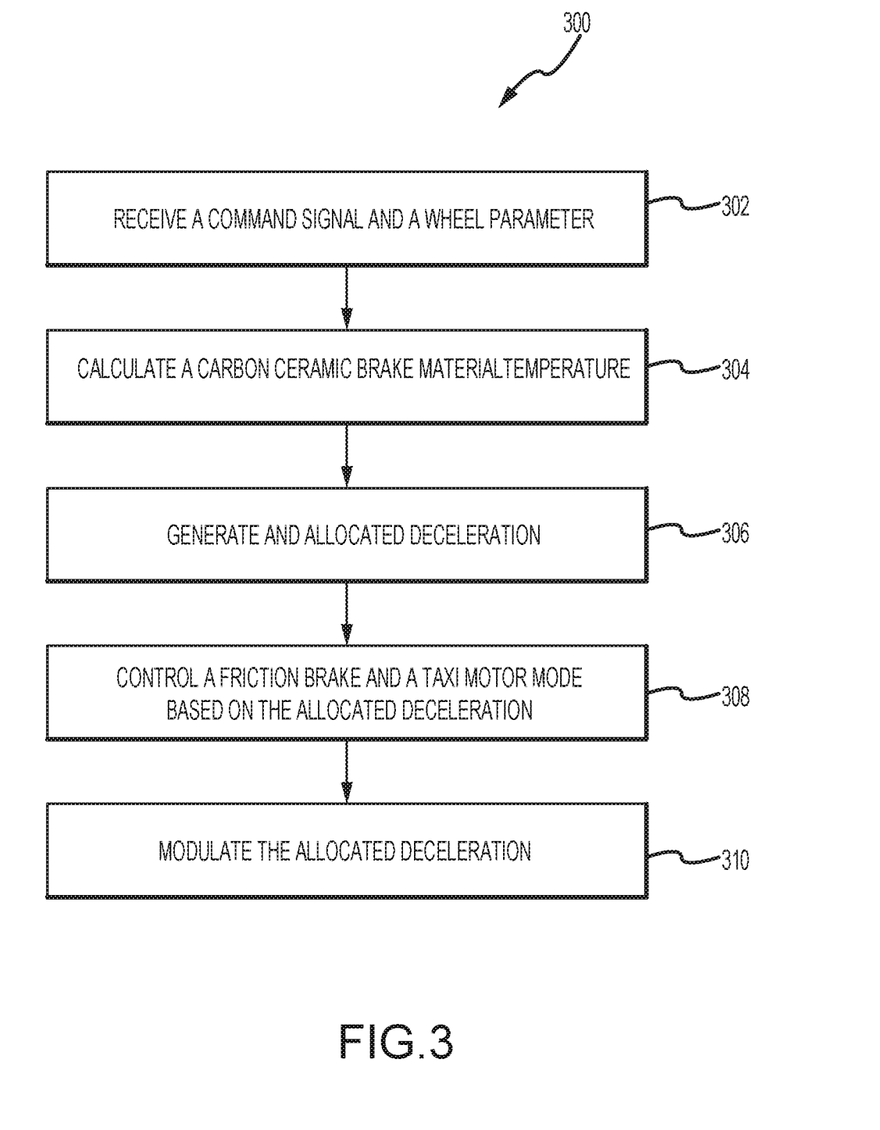
FIG. 3 illustrates a process flow for a method of electric taxi brake optimization, in accordance with various embodiments.

With reference to FIG. 3, a method 300 for aircraft electric taxi brake optimization is illustrated in accordance with various embodiments. Method 300 includes receiving, by a controller, a wheel parameter, a friction brake temperature, and a command signal (Step 302). Method 300 includes calculating, by the controller, a brake material temperature based on the wheel parameter, the friction brake temperature, and the command signal (Step 304). Method 300 includes generating, by the controller, an allocated deceleration for a friction brake and a regenerative brake corresponding to the calculated brake material temperature and the command signal (Step 306). Method 300 includes, controlling, by the controller one of, a brake pressure of a friction brake, a mode of a reversible taxi motor, a speed brake, a spoiler, a thrust reverser, or a gas turbine engine power setting in response to the command signal and the allocated deceleration (Step 308). Method 300 includes modulating, by the controller, the allocated deceleration based on one of an aircraft parameter from a sensor in electronic communication with the controller, the friction brake temperature, the command signal, a configuration setting, or external data (Step 310).

With reference to FIGS. 1, 2, and 3, step 302 may include receiving, by controller 204, command signals 207 from control interface 206 or external command signal 29 from external system 208, and receiving a wheel parameter of landing gear, such as landing gear 16, and a friction brake temperature from a wheel, such as wheel 17A, from sensors 202. Step 304 may include controller 204 conducing calculation by a time variant friction brake temperature model, a brake temperature optimization algorithm, or other algorithm based on configuration settings 210, parameters from sensors 202, or external data 212. Step 306 may include controller 204 generating allocated deceleration 218 for friction brakes 214, regenerative brakes 216, aerodynamic surfaces 27, and propulsion system 28. Step 308 may include, for example, controller 204 controlling spoilers or speed brakes such as those comprising aerodynamic surfaces 27, or controlling a gas turbine engine power setting, such as the gas turbine engine comprising propulsion system 28, or commanding taxi motors comprising regenerative brakes 216 to generator mode tending to charge energy storage system 30, in response to command signals 207 and allocated deceleration 218. Step 310 may include controller 204 modulating allocated deceleration 218 in response to an aircraft parameter from sensors 202, or in response to external data 212, or in response to configuration settings 210.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system, comprising:
an aircraft having a landing gear comprising a wheel;
a friction brake having a brake material coupled to the wheel;
a regenerative brake comprising a reversible taxi motor;
a sensor configured to measure a wheel parameter of the landing gear and a friction brake temperature of the friction brake; and
a tangible, non-transitory memory configured to communicate with a controller, the tangible, non-transitory memory having instructions stored thereon that, in response to execution by the controller, cause the controller to perform operations comprising:
receiving, by the controller, a command signal, the wheel parameter, and the friction brake temperature,
wherein the command signal comprises an instruction to at least one of decelerate or discontinue deceleration;
calculating, by the controller, a brake material temperature based on the wheel parameter, the friction brake temperature, and the command signal;
and generating, by the controller, an allocated deceleration for the friction brake and the regenerative brake corresponding to the calculated brake material temperature and the command signal,
wherein the allocated deceleration is based on a ratio between the friction brake and the regenerative brake.

2. The system of claim 1, wherein the wheel parameter is at least one of a torque, an angular rotation, a wheel speed, or a brake pressure.

3. The system of claim 1, wherein the operations further comprise controlling, by the controller, at least one of a brake pressure of the friction brake or a mode of the reversible taxi motor in response to the command signal and the allocated deceleration.

4. The system of claim 1, wherein the aircraft further comprises a propulsion system and aerodynamic surfaces.

5. The system of claim 4, wherein the operations further comprise generating, by the controller, an allocated deceleration for the propulsion system and the aerodynamic surfaces corresponding to the calculated brake material temperature and the command signal,
wherein the allocated deceleration is based on a ratio between each of the friction brakes, the regenerative brakes, the propulsion system, and the aerodynamic surfaces.

6. The system of claim 5, wherein the operations further comprise controlling, by the controller, at least one of a speed brake, a spoiler, a thrust reverser, or a gas turbine engine power setting in response to the allocated deceleration and the command signal.

7. The system of claim 6, further comprising a second sensor configured to measure an aircraft parameter of the aircraft.

8. The system of claim 7, wherein the operations further comprise reading, by the controller, the aircraft parameter and wherein the allocated deceleration is one of: generated, by the controller, based on the aircraft parameter or modulated, by the controller, in response to the aircraft parameter.

9. The system of claim 8, wherein the aircraft parameter is at least one of an airspeed, a ground speed, a position, a roll angle, a pitch angle, a yaw angle, an acceleration, a weight, an oleo strut pressure, a temperature, a battery capacity, an accumulator pressure, a thrust reverser position, a gas turbine engine power setting, a spoiler position, a speed brake position, an air pressure, or a generator power output.

10. The system of claim 1, wherein the operations further comprise modulating, by the controller, the allocated deceleration based on at least one of the friction brake temperature or the command signal.

11. The system of claim 10, wherein the operations further comprise receiving, by the controller, external data and modulating, by the controller, the allocated deceleration in response to the external data.

12. The system of claim 10, wherein the calculating, by the controller, the brake material temperature is further calculated with respect to time.

13. The system of claim 12, wherein the operations further comprise reading, by the controller, a first configuration setting wherein the calculating, by the controller, the brake material temperature is further based on the first configuration setting.

14. The system of claim 13, wherein the operations further comprise reading, by the controller, a second configuration setting and modulating, by the controller, the allocated deceleration in response to the second configuration setting.

15. A method, comprising:
receiving, by a controller, a command signal and receiving, by the controller, a wheel parameter and a friction brake temperature from a sensor in electronic communication with the controller wherein the wheel parameter comprises measured characteristics of a landing gear comprising a wheel, a friction brake having a brake material coupled to the wheel, and a regenerative brake comprising a reversible taxi motor coupled to the wheel,
wherein the command signal comprises an instruction to at least one of decelerate or discontinue deceleration;
calculating, by the controller, a brake material temperature based on the wheel parameter, the friction brake temperature, and the command signal; and
generating, by the controller, an allocated deceleration for the friction brake and the regenerative brake corresponding to the calculated brake material temperature and the command signal,
wherein the allocated deceleration is based on a ratio between the friction brake and the regenerative brake.

16. The method of claim 15, further comprising controlling, by the controller, at least one of a brake pressure of the friction brake, a mode of the reversible taxi motor, a speed brake, a spoiler, a thrust reverser, or a gas turbine engine power setting in response to the command signal and the allocated deceleration,
wherein the allocated deceleration is based on a ratio between each of the friction brakes, the regenerative brakes, and at least one of the speed brake, the spoiler, the thrust reverser, and the gas turbine engine power setting.

17. The method of claim 16, further comprising modulating, by the controller, the allocated deceleration based on one of an aircraft parameter from a second sensor in electronic communication with the controller, the friction brake temperature, the command signal, a configuration setting, or external data.

18. An article of manufacture including a tangible, non-transitory computer-readable storage medium having instructions stored thereon that, in response to execution by a processor, cause the processor to perform operations comprising:
receiving, by the processor, a command signal and receiving, by the processor, a wheel parameter and a friction brake temperature from a sensor in electronic communication with the processor wherein the wheel parameter comprises measured characteristics of a landing gear comprising: a wheel, a friction brake having a brake material coupled to the wheel, and a regenerative brake comprising a reversible taxi motor coupled to the wheel,
wherein the command signal comprises an instruction to at least one of decelerate or discontinue deceleration;
calculating, by the processor, a brake material temperature based on the wheel parameter, the friction brake temperature, and the command signal; and
generating, by the processor, an allocated deceleration for the friction brake and the regenerative brake corresponding to the calculated brake material temperature and the command signal,
wherein the allocated deceleration is based on a ratio between the friction brake and the regenerative brake.

19. The article of manufacture of claim 18, further comprising an operation of controlling, by the processor, at least one of a brake pressure of the friction brake, a mode of the reversible taxi motor, a speed brake, a spoiler, a thrust reverser, or a gas turbine engine power setting in response to the command signal and the allocated deceleration,
wherein the allocated deceleration is based on a ratio between each of the friction brakes, the regenerative brakes, and at least one of the speed brake, the spoiler, the thrust reverser, and the gas turbine engine power setting.

20. The article of manufacture of claim 19, further comprising an operation of modulating, by the processor, the allocated deceleration based on one of an aircraft parameter from a second sensor in electronic communication with the processor, the friction brake temperature, the command signal, a configuration setting, or external data.

\* \* \* \* \*